Dec. 20, 1927.
T. H. THOMAS
1,653,131
ELECTROPNEUMATIC BRAKE
Filed Jan. 4, 1927
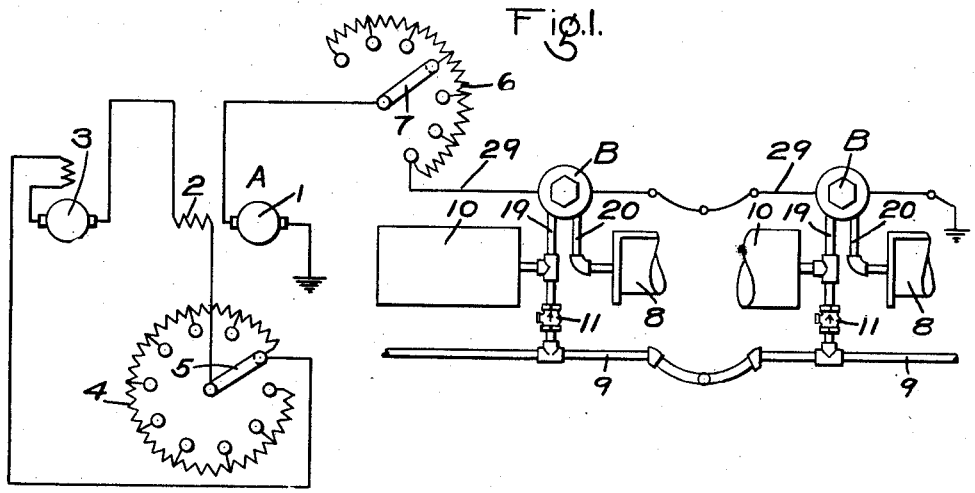
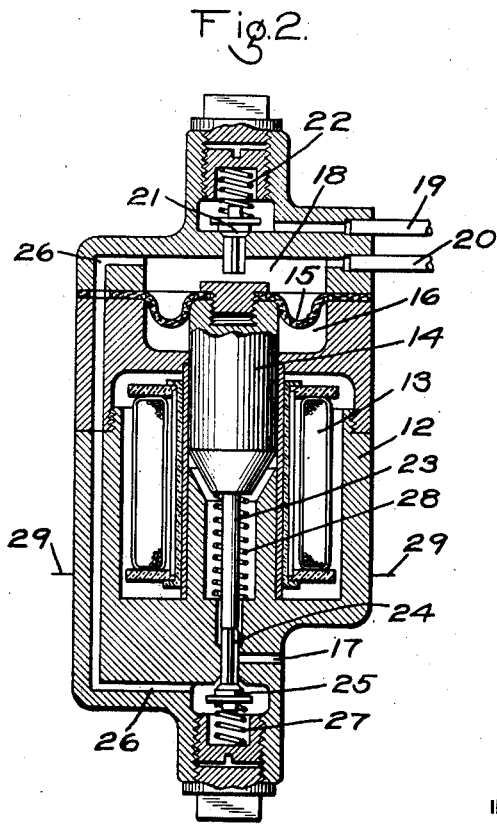
INVENTOR
THOMAS H. THOMAS
BY *Wm. M. Cady*
ATTORNEY Patented Dec. 20, 1927.

1,653,131

UNITED STATES PATENT OFFICE.

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

ELECTROPNEUMATIC BRAKE.

Application filed January 4, 1927. Serial No. 158,935.

This invention relates to electro-pneumatic brakes, and has for its principal object to provide an electro-pneumatic brake equipment adapted to be controlled by variations in current in a single train wire.

In the accompanying drawings; Fig. 1 is a diagrammatic view of an electro-pneumatic brake equipment as applied to a train and embodying my invention; and Fig. 2 a central sectional view of the electro-pneumatic valve device employed in the equipment shown in Fig. 1.

According to my invention, means are provided on the head car or locomotive for supplying current for controlling the brakes, a generator A being provided having an armature 1 and a field coil 2. The field coil 2 is excited by a separate source of current, such as the generator 3, and interposed in the field circuit is a variable resistance 4 having a controlling contact lever 5. A variable resistance 6 is included in the braking circuit of the generator A and is controlled by a contact lever 7. On each car, a magnet controlled valve device B is provided and a brake cylinder 8, a fluid pressure supply pipe 9, and a storage reservoir 10, adapted to be charged with fluid under pressure, through a check valve 11, from the supply pipe 9.

The electrically controlled valve device B may comprise a casing 12, containing a solenoid coil 13 having a solenoid core 14. Secured to one end of the core 14 is a flexible diaphragm 15 having a chamber 16 at one side open to the atmosphere through the clearance around the core to an exhaust port 17 and having the chamber 18 at the opposite side open through pipe 20 to the brake cylinder 8.

A valve 21 is disposed above and axially of the diaphragm 15 and is adapted when unseated by the upward movement of the diaphragm 15 to open communication from the reservoir 10 through pipe 19 to chamber 18 and the brake cylinder. A coil spring 22 acts on the valve 21 and tends to hold same seated.

The lower end of the core 14 carries a stem 23 adapted to engage the end of the stem 24 of the valve 25. When valve 25 is unseated, the brake cylinder is connected to the atmosphere through chamber 18, passage 26, past the valve 25 to the atmospheric exhaust port 17. A coil spring 27 tends to seat the valve 25 and a coil spring 28 acts on the lower end of the core 14.

A single train wire 29 connects the coils 13 of the magnet valve devices B of the train in series, and one terminal of the wire 29 is connected to one end of the variable resistance 6, while the other terminal is connected to ground.

The coils 13 are so wound that at a given current strength, the core 14 will be operated to hold the release valve 25 open. On the control vehicle, the contact arm 5 is at first placed in the position shown, in which all of the variable resistance is cut out of the circuit of the field coil 2, so as to cause a maximum excitation of the field coil. The contact lever 7 is then adjusted so as to provide a resistance in the braking circuit such that the current strength necessary for the energizing of coils 13 so as to cause the cores 14 to unseat the valves 25 will be provided.

For example, assume that 10 amperes is required to cause the operation of the core 14 so as to unseat the valve 25. With the contact lever 5 in the release position, as shown in the drawing, the contact arm 7 is moved to a position in which the current supplied by the generator A through the train wire 29 will be 10 amperes. The setting of the lever 7 will vary according to the length of the train, and when once set for a particular train is allowed to remain there.

With the coils 13 energized throughout the train, the valves 25 will be unseated, so that the brakes throughout the train will be released.

If it is desired to apply the brakes, the contact lever 5 is turned, so as to cut in a certain amount of the resistance of the variable resistance 4, dependent upon the degree of the brake application desired. The current flow through the field coil 2 is thus reduced, correspondingly reducing the current flow from the generator A through the train wire 29. The core 14 is then moved upwardly by the spring 28. The release valve 25 is then allowed to seat, and then after a slightly further movement of the core, the diaphragm 15 engages the stem of valve 21 and the valve is unseated, permitting flow of fluid under pressure from the reservoir 10 to the brake cylinder 8. When the pressure in the brake cylinder and in chamber 18 has been increased to a certain degree, the upward pressure of the core 14 is overcome by the downward pressure in chamber 18, acting on the diaphragm 15, and the diaphragm moves downwardly until the valve 21 is brought to its seat. Further flow of fluid to the brake cylinder is thus cut off. If it is desired to increase the pressure in the brake cylinder, the lever 5 is turned so as to cut in more resistance and thereby further reduce the current output of the generator A. The pulling force of the coil 13 is thus further weakened, permitting movement of the core 14 by spring 28, so as to again unseat the valve 21.

When the brake cylinder pressure has been further increased to a certain degree, the pressure in chamber 18 operates the diaphragm 15, so as to permit the valve 21 to seat.

In a similar manner, by moving the lever 5 in the opposite direction, the resistance in the circuit of the field coil 2 may be reduced and thereby the strength of the current in the train wire increased. The increased pull on the core 14 plus the brake cylinder pressure in chamber 18 then operates to move the core 14 downwardly so as to unseat the valve 25. Fluid is then vented from the brake cylinder until the pressure in chamber 18 has been reduced sufficiently to permit spring 28 to move the core upwardly so as to allow the valve 25 to seat. The brakes may be gradually released by partial successive movements of the lever 5 toward release position, or if it is desired to fully release the brakes, the lever 5 may be moved to release position, as shown in the drawing.

When the lever 5 is moved so as to open the circuit of the field coil 2, or if the train wire 29 should be broken, no current will flow through the solenoid coils 13, and as a result the cores 14 of the electrically controlled valve devices B throughout the train will be moved upwardly, holding the valve 21 unseated until the fluid pressure in each of the reservoirs 10 has fully equalized into the corresponding brake cylinder.

The brakes then cannot be released until the broken train wire has been repaired and until current is supplied to the train wire sufficient to cause the core 14 to operate the release valve 25.

The above described equipment may also be operated by placing the contact lever 7 in the position for maximum flow of current with all of the resistance 6 cut out and then moving the contact lever 5 to a position, varying with the length of the train, such that the voltage and current flow will be effective on the coils 13 to cause the cores 14 to hold the valves 25 unseated. Then when it is desired to apply the brakes, the lever 7 is turned to increase the resistance in the braking circuit and thus reduce the current flowing through the train wire 29 and the coils 13.

Having now described my invention, what I claim as new and desire to secure by Letters Patent, is:—

1. In an electro-pneumatic brake, in combination, electro-responsive means operated by a predetermined current flow for releasing the brakes and upon a reduction in current flow below said predetermined flow for applying the brakes, and means for varying the current flow to said electro-responsive means.

2. In an electro-pneumatic brake, in combination, electro-responsive means operated by a predetermined current flow for releasing the brakes and operated to apply the brakes at a pressure inversely proportional to the amount the current is reduced below said predetermined flow, and means for varying the current to said electro-responsive means.

3. In an electro-pneumatic brake, the combination with a brake cylinder, of electro-responsive means operated by a predetermined current flow for releasing fluid from the brake cylinder and upon a reduction in current flow below said predetermined flow for supplying fluid under pressure to the brake cylinder, and means for varying the current flow to said electro-responsive means.

4. In an electro-pneumatic brake, the combination with a single train wire, of electro-responsive means operated by a predetermined flow of current through said train wire for releasing the brakes and upon a reduction in the current flow below said predetermined flow for applying the brakes, and means for varying the current flow through said train wire.

5. In an electro-pneumatic brake, the combination with a brake cylinder, of a single train wire, electro-responsive means for controlling the admission and release of fluid under pressure to and from the brake cylinder, said electro-responsive means being operated upon an increase in current through said wire for releasing fluid from the brake cylinder and upon a reduction in current for applying the brakes, and means for varying the current through said train wire.

6. In an electro-pneumatic brake, the combination with a brake cylinder, of a single train wire, electro-responsive means for controlling the admission and release of fluid under pressure to and from the brake cylinder, said electro-responsive means being movable by an increase in current in said train wire toward a position for releasing fluid from the brake cylinder and upon a reduction in current toward a position in which fluid under pressure is supplied to the brake cylinder, and means for varying the current through said train wire.

7. The combination with electro-responsive means for controlling the application and release of the brakes, of a single train wire through which current is supplied to said electro-responsive means, an electric generator for supplying current to said wire, a variable resistance in circuit with said generator and the train wire, a source of current for supplying current to the field coil of said generator, and a variable resistance in said field coil circuit.

8. In an electro-pneumatic brake, the combination with a brake cylinder, of a valve for controlling the release of fluid from the brake cylinder, a valve for controlling the supply of fluid under pressure to the brake cylinder, and electro-responsive means operated by a predetermined current flow for opening said release valve and by a reduction in current flow for opening said supply valve.

In testimony whereof I have hereunto set my hand.

THOMAS H. THOMAS.